(12) United States Patent
Bauer et al.

(10) Patent No.: US 10,972,355 B1
(45) Date of Patent: Apr. 6, 2021

(54) MANAGING LOCAL STORAGE DEVICES AS A SERVICE

(71) Applicant: Amazon Technologies, Inc., Seattle, WA (US)

(72) Inventors: Jean-Paul Bauer, Seattle, WA (US); James Pinkerton, Sammamish, WA (US); Colin Harrison Brace, Mercer Island, WA (US); David Everard Brown, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 15/945,619

(22) Filed: Apr. 4, 2018

(51) Int. Cl.
*H04L 1/22* (2006.01)
*G06F 11/08* (2006.01)
*H04L 12/24* (2006.01)
*G06F 9/54* (2006.01)
*H04L 29/08* (2006.01)

(52) U.S. Cl.
CPC .............. *H04L 41/12* (2013.01); *G06F 9/547* (2013.01); *H04L 41/0677* (2013.01); *H04L 67/1097* (2013.01)

(58) Field of Classification Search
CPC . H04L 41/12; H04L 41/0677; H04L 67/1097; G06F 9/547
See application file for complete search history.

(56) References Cited

U.S. PATENT DOCUMENTS

| | | | | |
|---|---|---|---|---|
| 9,542,296 B1* | 1/2017 | Engers | ............... | G06F 11/3452 |
| 2012/0174096 A1* | 7/2012 | Conover | ............. | G06F 9/45558 |
| | | | | 718/1 |
| 2012/0215970 A1* | 8/2012 | Shats | .................. | G06F 12/0866 |
| | | | | 711/103 |
| 2013/0262801 A1* | 10/2013 | Sancheti | ............... | G06F 3/0619 |
| | | | | 711/162 |
| 2015/0046756 A1* | 2/2015 | Sreekumaran | ........ | G06F 11/008 |
| | | | | 714/47.2 |
| 2015/0058663 A1* | 2/2015 | Schmidt | ................ | G06F 11/203 |
| | | | | 714/6.24 |
| 2016/0070628 A1* | 3/2016 | Joshi | ................... | G06F 11/2094 |
| | | | | 714/6.22 |
| 2017/0364378 A1* | 12/2017 | Lipchuk | .............. | G06F 9/45558 |

* cited by examiner

*Primary Examiner* — Nicholas R Taylor
*Assistant Examiner* — Sanjoy Roy
(74) *Attorney, Agent, or Firm* — Nicholson De Vos Webster & Elliott LLP (57) ABSTRACT

Techniques for are described which enable users of a service provider network to manage local storage devices connected to computer systems of the service provider network as a service. A service provider network provides an application programming interface (API) that enables users to manage local storage devices in association with compute instances created by users using a hardware virtualization service of the service provider network. The API can be used to attach local storage devices to compute instances (that is, make local storage devices available for use as a block storage device), detach local storage devices from compute instances (that is, make local storage devices unavailable for use by a compute instance and possibly available for use by other compute instances on the same computer system), among other possible operations.

20 Claims, 8 Drawing Sheets

MANAGING LOCAL STORAGE DEVICES AS A SERVICE

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media are described which enable users of a service provider network to manage local, non-redundant storage devices connected to computer systems of the service provider network as a service. In some embodiments, a service provider network provides an application programming interface (API) that allows users to interact with a wide variety of computing resources offered by the service provider network, including compute instances provided by a hardware virtualization service, storage resources provided by a storage virtualization service, and so forth. According to embodiments described herein, a service provider network API includes API endpoints that enable users to manage local storage devices connected to host computer systems upon which users' compute instances are executing. For example, a user may use the local storage API to attach new local storage devices to a compute instance (that is, to make new local storage devices available to a compute instance for use as a block storage device), to detach currently attached local storage devices from an instance (that is, to make an attached local storage device unavailable to a compute instance for use as a block storage device and possibly available to other compute instances for use), among other possible operations. In some embodiments, a local storage device API also enables users to indicate additional information about the actions users may take with respect to local storage devices, for example, to indicate that a user is detaching a storage device because the user believes the storage device is faulty or is otherwise not operating as expected, to indicate that the user desires a replacement storage device, and so forth. By enabling users to manage local storage devices as a service via an API, a service provider network can better coordinate the use of local storage devices among any number of users' compute instances running on a computer system.

As indicated above, in recent years, organizations have begun to realize the benefits of moving their computing resources—for example, servers, data storage, networks, and applications—out of their existing on-premises data centers and into systems managed by third-party service providers. These service provider networks typically provide a wide variety of configurable computing resources that can be provisioned and accessed over the internet, often using a "pay-as-you-go" or similar payment model. The ability to readily obtain such computing resources from these service providers eases many of the burdens organizations face in managing on-premises data centers, which tend to be expensive to maintain and frequently encounter scalability and resiliency issues.

A common type of computing resource offered by these types of service providers are compute instances, which are typically used by customers in the form of virtual computing resources, or virtual machine (VM) instances. These VM instances, which are hosted by a service provider on physical computer systems with their own operating systems and other software components, can be used in much the same manner as physical computers.

A service provider network typically offers various types of storage resources usable by compute instances created by users of a service provider network. For example, a service provider network may enable users' compute instances to use remote, network-accessible storage volumes (for example, persistent storage volumes provided by a separate storage virtualization service of the service provider network). In some embodiments, a service provider network also enables users' compute instances to use "local" storage devices such as hard disk drives (HDDs), solid-state drives (SSDs), or other types of secondary storage that typically are installed inside of a host computer system or closely attached to the system. These local storage devices may generally be associated with greater performance and lower latency compared to remote storage devices, but often represent a more unreliable form of storage—that is, local storage devices generally lack the data redundancy and durability of other types of remote storage. A computer system may be connected to such local storage devices using any of a number of types of interconnects such as, for example, parallel AT Attachment (PATA), Serial ATA (SATA), Small Computer System Interface (SCSI), Serial Attached SCSI (SAS), Fibre Channel, Ethernet, and so forth. Users can use both remote and local storage resources to store virtually any type of data in connection with a compute instance.

In existing service provider networks, the use of local storage devices by compute instances typically is configured when a compute instance is initially launched. For example, a user may identify one or more local storage devices to "attach" to a compute instance when the instance is launched, where a local storage device is visible to the instance and available for use when attached. The user can then use the launched compute instance to format and mount the local storage device for use as desired by the user. However, the ability to further configure use of local storage devices generally is not available while a compute instance is running, including the ability to add additional local storage devices or to detach and attach different local storage devices. Thus, users' compute instances may be tied to a certain number of local storage devices, if any at all, even if a user intends to use only a subset of the storage devices, later desires to use additional local storage devices, or desires to replace an existing local storage device with another one.

As indicated above, local storage devices connected to a computer system are susceptible to integrity and failure issues in the course of operation. When a local storage device fails, in some examples, a service provider network may send notices to any compute instances running on the associated computer system (including compute instances unassociated with the failed storage device), wait for the compute instances running on the computer system to relocate to other computer systems, and then dispatch an information technology (IT) technician to examine the faulty storage device and, if necessary, repair or replace the storage device. A storage device failure can thus have a significant impact on compute instances running on a computer system, even for those instances that do not rely on the faulty local storage device.

According to embodiments described herein, instead of forcing compute instances to vacate a computer system upon failure of a local storage device, a user associated with a compute instance attached to a local storage device that appears to have failed can instead generate a request using a local storage device API provided by the service provider to detach the failed local storage device. The request may further indicate that the user believes the storage device is faulty and, optionally, can indicate a desire to attach a new local storage device to replace the faulty storage device, if possible. In response to receiving the request, the service provider network may perform various operations to attempt repairing the local storage device such as, for example, running one or more performance tests, power cycling the device, among other operations. The service provider network may further identify a replacement storage device for the user, where the replacement storage device may be a repaired version of the faulty storage device, a spare local storage device connected to the same computer system, or a new local storage device that has been installed to replace the failed storage device. In this manner, when a user detects a failed local storage device and generates a request relaying this information to the service provider network, the storage device can be more readily repaired or replaced with less downtime to the user's instance and other user instances running on the same host computer system.

As another example, a user associated with a compute instance may detect that a local storage device attached to the instance is not performing as expected. For example, the user may analyze the storage device's performance over time and determine that the device is exhibiting outlier performance metrics. In this example, the user may desire to have the underperforming storage device replaced with an at least equivalent storage device without the same performance issues. In this example, the user may similarly generate a request to the service provider network indicating that the storage device is not performing as expected. The service provider network receiving the request can examine the storage device and identify a replacement storage device for the user or, in some cases, an underperforming storage device can be readily repaired with a power cycle, for example, to remedy a firmware error or memory leak.

In some embodiments, the ability to manage local storage devices using an API may further enable users to add additional local storage devices to their instances, if any spare additional storage devices are available (possibly at an additional cost to the user). For example, a user may have a compute instance running on a computer system that has twelve local storage devices total, only eight of which are currently in use by other compute instances running on the same computer system. In this example, if the user generates an API request for an additional local storage device, the service provider network may allow the user to attach an additional storage device from the four spare storage devices available.

In general, the availability of publicly accessible API endpoints for managing users' local storage devices enables the service provider network to better understand user intent when users take actions with respect to the storage devices. For example, if a user simply mounts or unmounts a local storage device using a compute instance running on a service provider computer system, that information may be discoverable by the service provider network via a hypervisor or other component running on the computer system, but the information indicates little about why the user performed those operations. According to embodiments described herein, an API can include methods that provide an indication of a user's intent when taking certain actions with respect to local storage devices. For example, using particular API requests and request parameters, a user may indicate that the user is detaching the storage device and does not desire a replacement storage device, indicate that the user believes that the storage device is faulty, indicate that the user desires a replacement storage device, or indicate other types of user intent-related information that a service provider network can use to take appropriate action.

Figure 1:
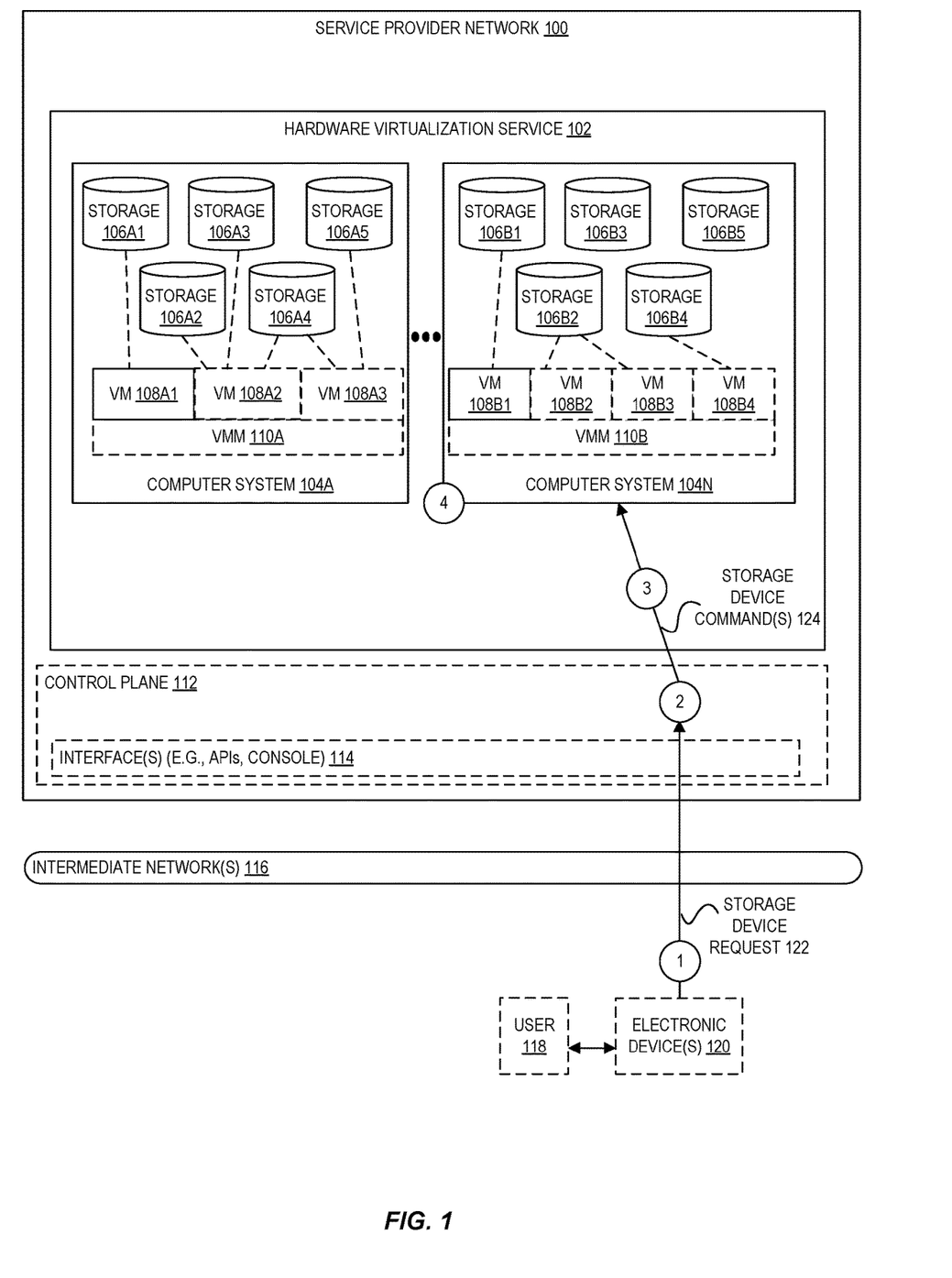
FIG. 1 is a diagram illustrating a service provider network environment including a hardware virtualization service, the hardware virtualization service including computer systems connected to local, non-redundant storage devices that can be managed using a service of the service provider network according to some embodiments.

FIG. 1 is a block diagram illustrating a service provider network environment including a hardware virtualization service, the hardware virtualization service including computer systems connected to local storage devices which can be managed as a service. In some embodiments, a hardware virtualization service 102, which can include any number of computer systems 104A-104N that support the service, and any number of other services (not shown) operate as part of a service provider network 100 and each comprise one or more software modules executed by one or more electronic devices at one or more geographic locations and data centers managed by the service provider.

A service provider network 100 allows users to use a variety of computing-related resources, such as compute resources (for example, executing virtual machine (VM) instances and/or containers, executing batch jobs, executing code without provisioning servers), data/storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), and so forth. These and other computing resources may be provided as services, such as a hardware virtualization service 102 that can execute server instances, a storage virtualization service (not shown) that can store data objects, and so forth. The users (or "customers") of a service provider network 100 may use one or more user accounts that are associated with a customer account, though these terms may be used somewhat interchangeably depending upon the context of use. Users may interact with a service provider network 100 across one or more intermediate networks 116 (for example, the internet) via one or more interface(s) 114, such as through use of application programming interface (API) calls, via a console implemented as a website or application, and so forth. The interface(s) 114 may be part of, or serve as a front-end to, a control plane 112 of the service provider network 100 that includes "backend" services supporting and enabling the services that may be more directly offered to customers.

To provide these and other computing resource services, service provider networks 100 often rely upon virtualization techniques. For example, virtualization technologies may be used to allow users to control and use compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Each of the computer systems 104A-104N, for example, may include a hypervisor or virtual machine manager (VMM), such as VMM 110A and 110B shown in FIG. 1. Thus, a user may directly use a compute instance hosted by the service provider system to perform a variety of computing tasks or may indirectly use a compute instance by submitting code to be executed by the service provider network, which in turn uses a server instance to execute the code (typically without the user having any control of or knowledge of the underlying server instance(s) involved).

As indicated above, it is desirable at times for users to manage local storage devices connected to computer systems 104A-104N of a hardware virtualization service 102 (for example, local storage devices 106A1-106A5 connected to the computer system 104A or local storage devices 106B1-106B5 connected to the computer system 104N). As indicated above, local storage devices 106A1-106A5 and 106B1-106B5 generally represent unreliable, non-redundant storage and may include hard disk drives (HDDs), solid-state drives (SSDs), or other types of secondary storage that typically are installed inside of a host computer system or closely attached to the system. Computer systems 104A-104N may connect to such local storage devices 106A1-106A5 and 106B1-106B5 using one or more types of interconnects such as, for example, Serial AT Attachment (SATA), Small Computer System Interface (SCSI), Serial Attached SCSI (SAS), Fibre Channel, Ethernet, and so forth. Users can use such storage devices to store virtually any type of data in connection with a compute instance. As shown, a computer system (for example, computer system 104A) may include any number of customer VMs (for example, VMs 108A1-108A3), each of which may be associated with one or more local storage devices. Furthermore, each local storage device may be associated with one or more separate VMs—that is, a local storage device may logically partition the storage available on the device between two or more separate VMs (for example, storage device 106A4 serves as a storage device for both VM 108A2 and VM 108A3).

According to embodiments described herein, the ability to manage local storage devices can include the ability to attach new local storage devices, to detach a currently attached storage device, to create a snapshot of a local storage device, to recreate a local storage device from a snapshot, among other possible operations and variations thereof. The management of local storage devices may further include the ability for users to provide additional information related to requested storage device operations such as, for example, to indicate that the user believes a local storage device is faulty or underperforming and, in some cases, to indicate that the user desires to replace a faulty local storage device with an at least equivalent replacement storage device.

Referring to FIG. 1, at the circle labeled "1," a user 118 requests a service provider network 100 to perform one or more operations related to one or more local storage devices by generating a storage device request 122. For example, a user may use an interface 114, which may include a command line interface (CLI), web-based console interface, or any other type of interface, accessed via one or more electronic device(s) 120 and used to generate a request to perform a desired local storage device-related operation. In an embodiment, a storage device request 122 may include an indication of the desired operation (for example, to detach a local storage device, to attach a local storage device, to create a snapshot of a local storage device, to obtain status information for the local storage device, and so forth), an identifier of the local storage device to which the operation is to be performed, an identifier of the VM to which the storage device is currently attached, among other possible parameters. For example, the storage device request 122 may comprise an API request with a name (for example, "detach-local-storage-device") and various parameters and flags (for example, a storage device identifier, a VM identifier, an optional device failure flag, and so forth).

In an embodiment, one example of a storage device request 122 is a request to attach a local storage device to a user's VM or compute instance—that is, to make the local storage device available to the compute instance for use as a block storage device. For example, a user may use a console interface to view a list of local storage devices (or available portions of local storage devices) connected to a computer system and that are not currently in use by another compute instance on the same computer system, to select an available local storage device, and to provide an identifier of a compute instance to which the local storage device is to be attached (for example, a user associated with a compute instance 108B4 in FIG. 1 may generate a request to attach the currently available local storage device 106B5 to the instance). The user may generate such an attach request and, once the selected storage device is attached and associated with the identified compute instance, the user can further use the compute instance to format and mount the local storage device for use as desired.

In an embodiment, another example of a storage device request 122 is a request to detach a local storage device from a compute instance. For example, if a user no longer desires to use a local storage device that is currently attached to the user's compute instance, the user can unmount the local storage device using the associated compute instance (or, if the storage device is the root storage device for the instance, stop the instance) and then generate a request for the storage device to be detached from the instance. In an embodiment, once detached, the storage device is no longer available to the associated compute instance for use unless the storage device is re-attached, and the device may become available to other compute instances running on the same computer system for attachment. For example, if a compute instance 108A3 detaches the storage device 106A5, the storage device may become available for attachment by any of compute instances 108A1 and 108A2, each of which may be associated with a same or different user than that associated with the instance 108A3.

In an embodiment, at circle "2," the storage device request 122 generated at circle "1" is received by a computer system located in a control plane 112 of the service provider network 100. As indicated above, the control plane 112 generally comprises a set of computer systems and services that can be used to process user requests (for example, storage device requests 122) and to propagate the requests to appropriate compute instances running in a hardware virtualization service 102 (and to propagate other types of requests to other compute resources and services, among other functionality). For example, a computer system located in the control plane 130 receiving a storage device request 122 can examine the request to identify a requested operation (for example, attach, detach, and so forth), identifiers of an associated compute instance and local storage device, among other possible information, and direct the request to the appropriate computer system in the hardware virtualization service 102. For example, at circle "3" in FIG. 1, the control plane 130 generates, based on information contained in the storage device request 122, one or more corresponding storage device commands 124 that are sent to the computer system 104N at the hardware virtualization service 102.

In one embodiment, the one or more storage device commands 124 sent to a computer system comprise one or more API calls specifying one or more actions to be performed at the computer system. For example, the commands may include instructions that cause the computer system to detach a storage device, attach a storage device, create a snapshot, and so forth. In one embodiment, the command(s) 124 are received by an agent running on the computer system and which may, for example, be hosted in the VMM (which may be running on processors of the computer system or on a separate offload device) or the commands may be received and processed by other software components running on the computer system.

In an embodiment, at circle "4," the computer system 104N receives the one or more storage device commands 124 from the computer system in the control plane 112 and, in response, performs one or more operations relative to one or more of the local storage devices 106B1-106B5. As indicated above, the storage device commands 124 may be received by an agent running on the computer system 104N and configured to interface with the control plane 112. In other embodiments, a control plane 112 may interact directly with a VMM 110B running on the computer system, or directly with particular compute instances 108B1-108B4 running on the computer system 104N. For example, if the storage device request 122 is a detach request, the computer system 104N may cause a VMM 110B or other component of the computer system 104N to perform one or more actions to remove the association of an identified storage device with an identified compute instance. Depending on other information included in the request, the computer system 140N may perform additional actions such as running tests to verify the health status of a storage device, running performance tests on the storage device, power cycling a storage device, identifying a replacement storage device, and so forth. Examples of additional actions that may be performed by a computer system are illustrated below in FIGS. 2-4.

In one embodiment, a control plane 112, a hardware virtualization service 102, or other component of the service provider network 100 maintains, for some or all of the computer systems 104A-104N of the hardware virtualization service 102, information about the local storage devices connected to each computer system. For example, in reference to the example computer system 104N, the information may include an indication of which local storage devices 106B1-106B5 (or portions thereof) are attached to which compute instances 108B1-108B4, other status information about the local storage devices 106B1-106B5 (for example, health status information, performance information, storage device specifications), and so forth. In an embodiment, this information can be used by a service provider network 100, for example, to know which local storage devices are currently attached to a compute instance (and thus possibly unavailable to other compute instances for attachment), which storage devices (or portions thereof) are currently available for attachment and use by a compute instance, which storage devices have been flagged for repair or maintenance, and so forth.

Figure 2:
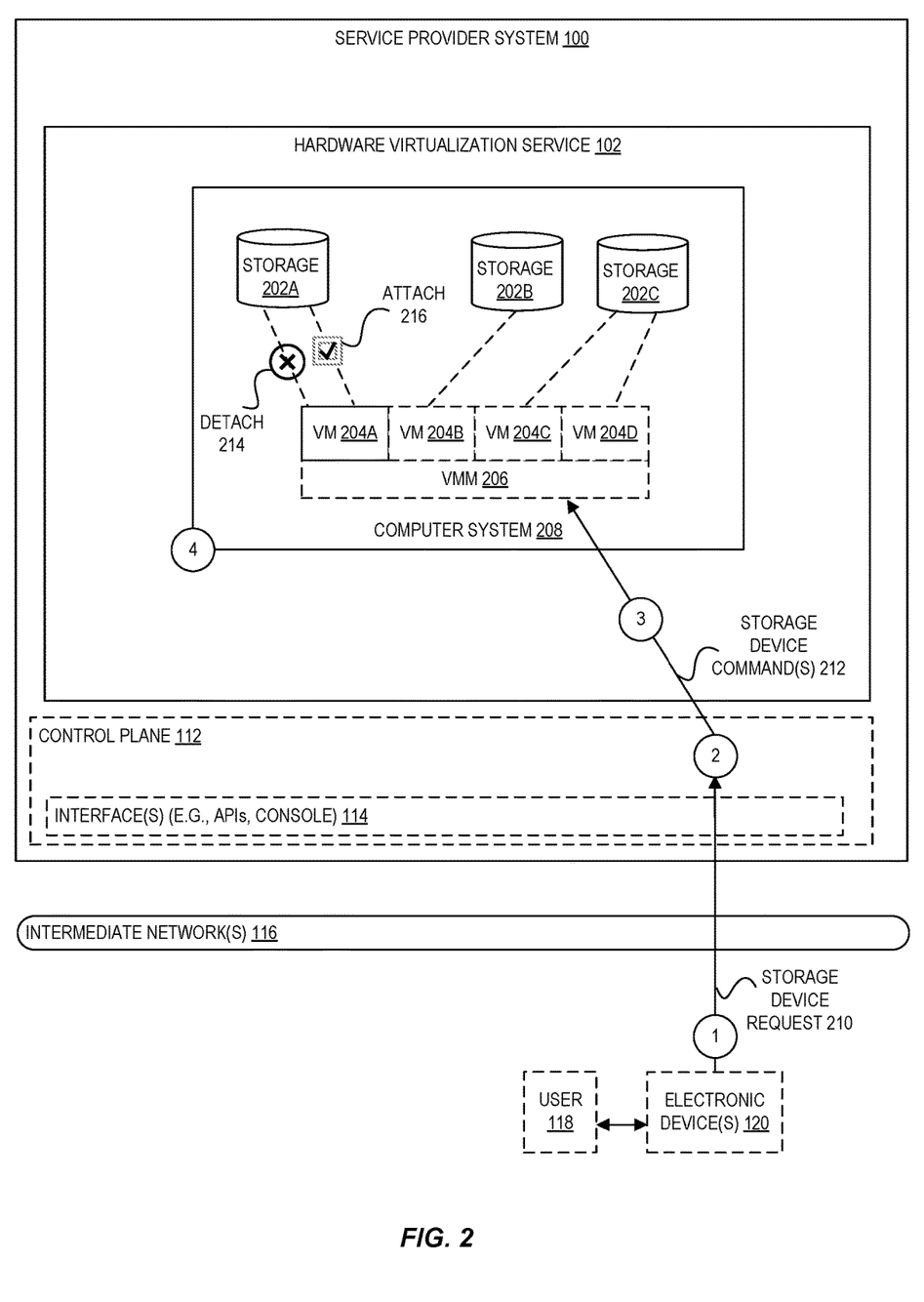
FIG. 2 is a diagram illustrating a user sending a request to a service provider network to detach a faulty local storage device from a compute instance and, in response to the request, the service provider network repairing the faulty local storage device and re-attaching a repaired version of the local storage device to the user's compute instance according to some embodiments.

As indicated above, a storage device request 122 may include information indicating a requested operation to be performed on a local storage device and, optionally, additional information related the user's reasons for requesting a certain operation (for example, to indicate whether the user believes the storage device is faulty, whether the user desires to attach a replacement storage device, and so forth). This additional information can be used by the service provider network 100 to perform selected operations depending on the user's reasons for generating a particular request. FIG. 2, for example, is a diagram illustrating a process for detaching a local storage device, repairing the storage device, and causing a computer system to re-attach a repaired version of the same storage device.

In FIG. 2, at the circle labeled "1," a user generates a storage device request 210 that is sent to the service provider network 100, the request indicating a desire to detach a local storage device 202A and additionally including an indication that the user desires to attach an at least equivalent storage device in its place. For example, a user may generate the request 210 because the user believes that the storage device 202A has failed or is otherwise not operating as expected. The user may indicate this information, for example, by generating a particular API request (for example, a "detach-and-reattach" request) or by including a flag associated with an API request to indicate the user's desire for a replacement storage device (for example, a "detach" request with a "--replace" flag) and optionally indicating the user's belief that the storage device is faulty (for example, by adding a "--faulty" flag to the request). A particular API request may be generated by a user manually (for example, by using a CLI interface) or generated for the user based on user input received using a web interface or other type of interface.

In an embodiment, at circle "2" in FIG. 2, the control plane 130 receives the storage device request 210 including the indication of the user's desire to attach an at least equivalent local storage device and further indicating that the user believes the storage device is faulty. At circle "3," the control plane 130 generates one or more corresponding storage device commands 212 that are sent to the computer system 208 at the hardware virtualization service 102 based on the request.

In an embodiment, if a storage device request 210 includes an indication that the storage device is believed to be faulty, the service provider network 100 can perform various processes to verify a status of the storage device and, if the storage device is confirmed to be faulty, take various repair and replacement actions, as needed. For example, at the circle "4" in FIG. 2, in response to receiving the one or more storage device commands 212, an agent running in the VMM 206 or other component of the computer system 208 can detach 214 the local storage device 202A from the compute instance (indicated by the "X" overlaying the line connecting the compute instance 204A with the local storage device 202A) and perform one or more tests to assess the status of the identified local storage device. In an embodiment, if the tests confirm that there is an issue with the storage device 202A, the agent can attempt to repair the storage device 202A. For example, the agent may first attempt to power cycle the storage device (including both a "soft" reset and, if unsuccessful, a "hard" reset of the storage device). In an embodiment, the agent may further run one or more performance tests on the storage device 202A to determine additional information about the storage device's performance and whether the repair actions were successful. In the example shown in FIG. 2, repair actions are taken on a storage device 202A (for example, the storage device 202A may have been power cycled) and subsequent tests confirm that the storage device is operating as expected after the repair. In this example, the storage device 202A is available for use again in its repaired state.

In an embodiment, once the computer system 208 has repaired the storage device 202A, as described above, the computer system 208 may notify a user associated with the request 210 that the storage device 202A is repaired and again available for use, or the storage device may be automatically attached 216 to the same instance (for example, as indicated by the checkmark overlaying the line connecting the compute instance 204A with the storage device 202A. In an embodiment, a user can be notified of the availability of the storage device using a push-based model, where an event message is generated by the computer system 208 or an external monitoring service and that can be accessed by the user using a web or other type of interface. In other examples where a user has requested the automatic attachment of an at least equivalent storage device, the user may configure an associated compute instance 204A to perform device arrival monitoring and when the storage device 202A is repaired, the user's instance can automatically attach and reconfigure the storage device for use. In some embodiments, the use the storage device 202A may include using different storage locations on the same storage device 202A, for example, if it is determined that only a portion of the storage device 202A is faulty.

Figure 3:
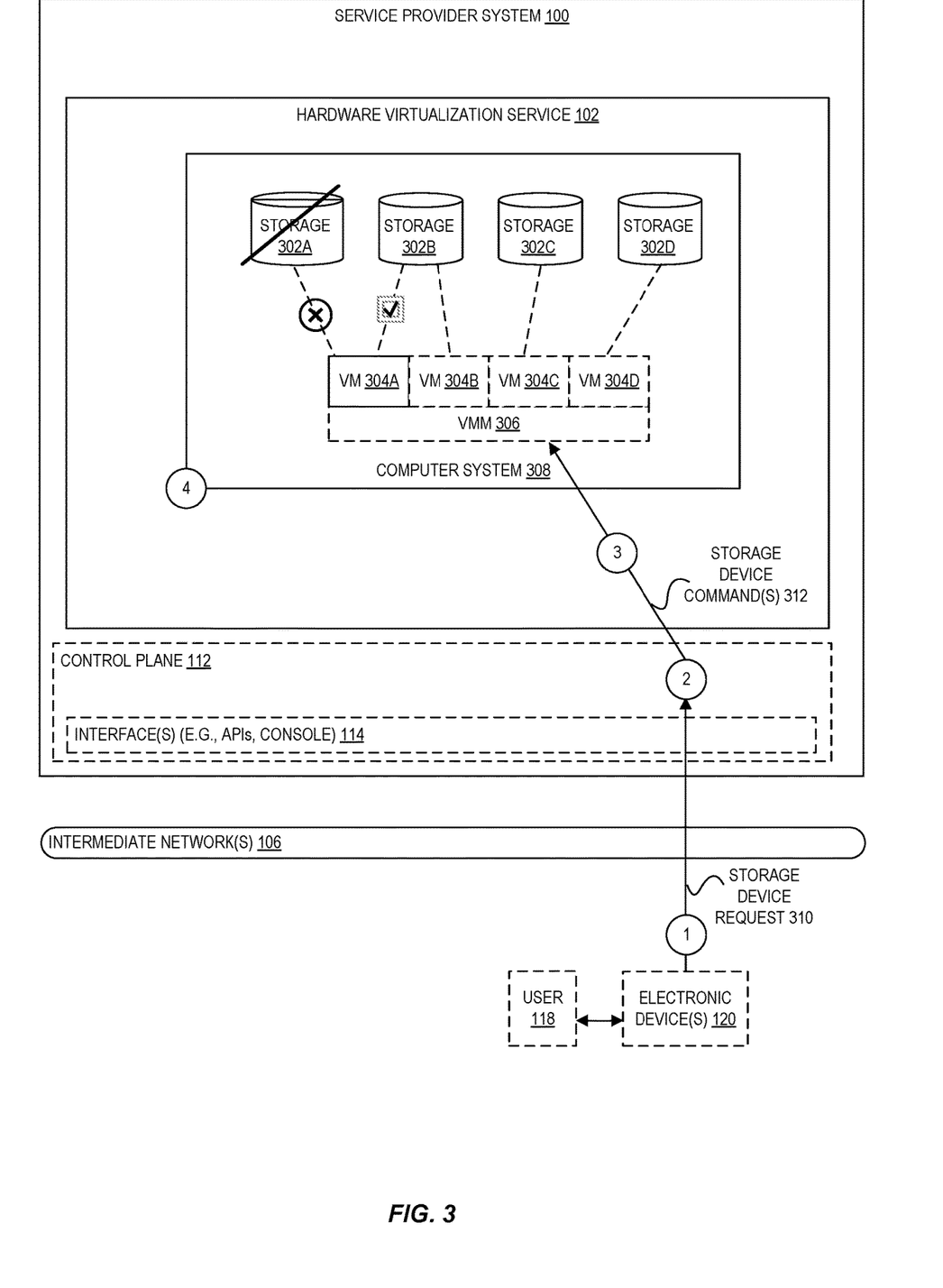
FIG. 3 is a diagram illustrating a user sending a request to a service provider network to detach a faulty local storage device from a compute instance and, in response to the request, the service provider network detaching the faulty local storage device and attaching an available spare local storage device to replace the faulty local storage device according to some embodiments.

FIG. 3 is a diagram illustrating a process for detaching a local storage device and causing a computer system to attach a spare storage device available at the same computer system according to some embodiments. For example, the process illustrated in FIG. 3 shows an example process that may be performed when a user requests detachment of a storage device that has failed and for which non-trivial repair steps may be needed before the device can be used again.

In FIG. 3, at the circle labeled "1," a user generates a storage device request 312 that is sent to the service provider network 100, the request indicating a desire to detach the local storage device 302A and to attach an at least equivalent storage device, and a further indication that the user believes the storage device 302A has failed. At circle "2," the control plane 130 receives the storage device request 310 and, at circle "3," generates one or more corresponding storage device commands 312 that are sent to the computer system 308 at the hardware virtualization service 102.

Similar to FIG. 2, the storage device commands 312 may include instructions for the computer system 308 to perform various processes including verifying a status of the storage device 302A and, if needed, to take various repair actions. In one embodiment, if repair actions performed by the computer system 308 are unsuccessful, an additional workflow can be triggered that may result in an IT technician physically replacing the storage device at the computer system 308. For example, a notification may be generated that instructs an IT technician to perform maintenance at the computer system. In FIG. 3, the storage device commands 312 result in the compute instance 304A detaching the storage device 302A, as indicated by the "X" overlaying the line connecting the instance to the storage device.

In the example shown in FIG. 3, a computer system 308 or control plane 112 identifies a portion of a spare storage device 302B for the compute instance 304A to use in place of the failed storage device 302A. For example, the computer system 308 or control plane 112 may use stored information indicating which storage devices 302A-302D are currently in use by one of compute instances 304A-304D and which storage devices currently have storage space available for use. In FIG. 3, the storage device 302B is determined to have storage space available for attachment to the compute instance 304A in place of the failed storage device 302A (indicated by the checkmark overlaying the line connecting the compute instance 304A to the storage device 302B).

Figure 4:
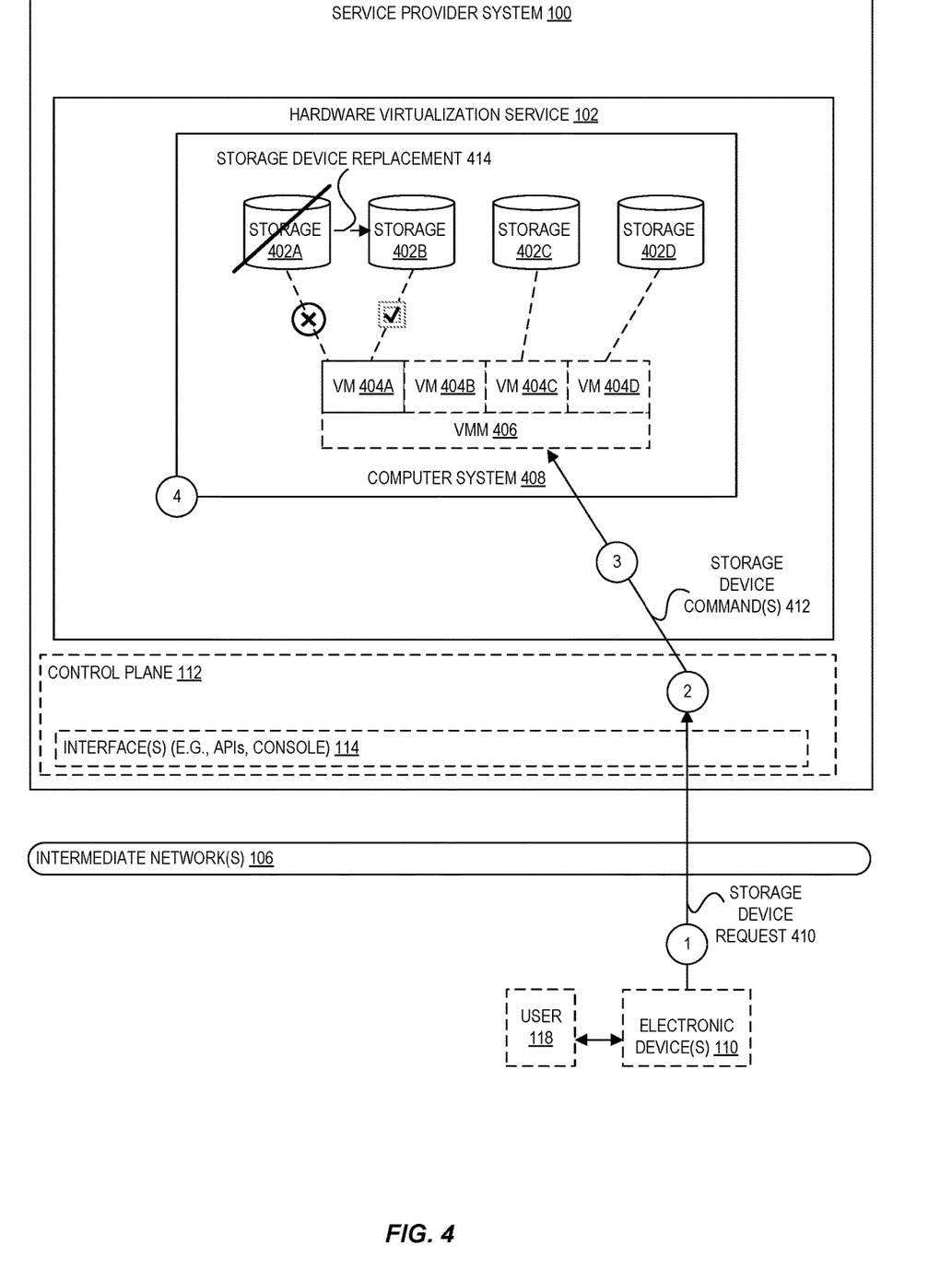
FIG. 4 is a diagram illustrating a user sending a request to a service provider network to detach a faulty local storage device and, in response to the request, the service provider network detaching the faulty local storage device and attaching a new local storage device physically replacing the faulty local storage device according to some embodiments.

FIG. 4 is a diagram illustrating another example process of detaching a locally connected storage device and causing a computer system to attach a replacement storage device according to some embodiments. For example, the process illustrated in FIG. 4 shows an example process that may be performed when a user requests detachment of a storage device that has failed and the user's compute instance is attached to a healthy local storage device that physically replaces the failed storage device.

Similar to FIGS. 1-3, in FIG. 4, at circle "1," a user generates a storage device request 412 sent to the service provider network 100, the request indicating a desire to detach the local storage device 402A and to attach an at least equivalent storage device, and the request further indicating that the user believes the storage device 402A has failed. At circle "2," the control plane 130 receives the storage device request 410 and, at circle "3," generates one or more corresponding storage device commands 412 sent to the computer system 308 at the hardware virtualization service 102. The storage device commands 412 may include instructions for the computer system 408 to perform various processes including verifying a status of the storage device 402A and, if needed, to take various repair actions, as described above. In FIG. 4, the actions result in an IT technician physically replacing 414 the storage device at the computer system 408 with a healthy storage device 402B (for example, indicated by the line connecting storage device 402A and 402B). In an embodiment, after the replacement local storage device 402B is installed, additional verification tests may be run to ensure that the new storage device is operating as intended and then the storage device 402B can be attached to the compute instance 404A, as described above.

In some embodiments, a request to detach a local storage device may include a flag indicating that the user desires for the data stored on the storage device to be migrated to a new storage device, if possible. For example, if a disk snapshot for an identified storage device exists or can be created when a user requests for a storage device to be detached, the disk snapshot can be used to restore data contained on the storage device at a different storage device. For example, if a user determines that a storage device is underperforming and desires to the move the data the user has on the storage device to a different, better performing storage device, a disk snapshot of the underperforming storage device can be used to move the user's data to the better performing storage device.

In some cases, a user may generate a detach storage device request including an indication that the user desires to attach an at least equivalent local storage device, however, an available storage device may not exist at the computer system. In some embodiments, a control plane 112 receiving such a request can determine that an available replacement storage device is not available and, in response to the determination, cause the compute instance associated with the request to be migrated to a different computer system having an available local storage device. For example, a separate server migration service of the service provider network may be used to migrate the compute instance (for example, by generating a snapshot of the compute instance and using the snapshot to launch a migrated copy of the compute instance at a different computer system of the hardware virtualization service).

In some examples, a user may generate a request indicating that a local storage device is faulty, where the indicated local storage device includes separate storage volumes associated with two or more different compute instances. In this example, the control plane 112 or a computer system at which the local storage device is located may determine whether the storage device failure is an isolated or disk-wide failure. If it is determined that the failure is isolated to a portion of the disk, for example, the control plane 112 may cause the affected compute instance to be attached to a different local storage device or different portion of the same local storage device without disrupting any other compute instances using the same storage device. If instead it is determined that the failure is disk-wide, the control plane 112 may reattach all compute instances associated with the failed disk to new storage devices.

In some embodiments, users may request to attach an additional local storage device, if there is one available from the pool of storage devices, possibly at an additional cost to the user. For example, when a user creates a compute instance, the service provider may provide a specified number of local storage devices available for use by the compute instance. If a user desires to use additional local storage devices in association with the compute instance the user can send a request and, if any additional local storage devices are available, a device can be attached to the compute instance. For example, a computer system or control plane may determine a number of available spare storage devices, determine whether any existing local storage devices guarantees for other compute instances can be met, and if so, cause an additional spare storage device to be attached to the requesting compute instance.

Figure 5:
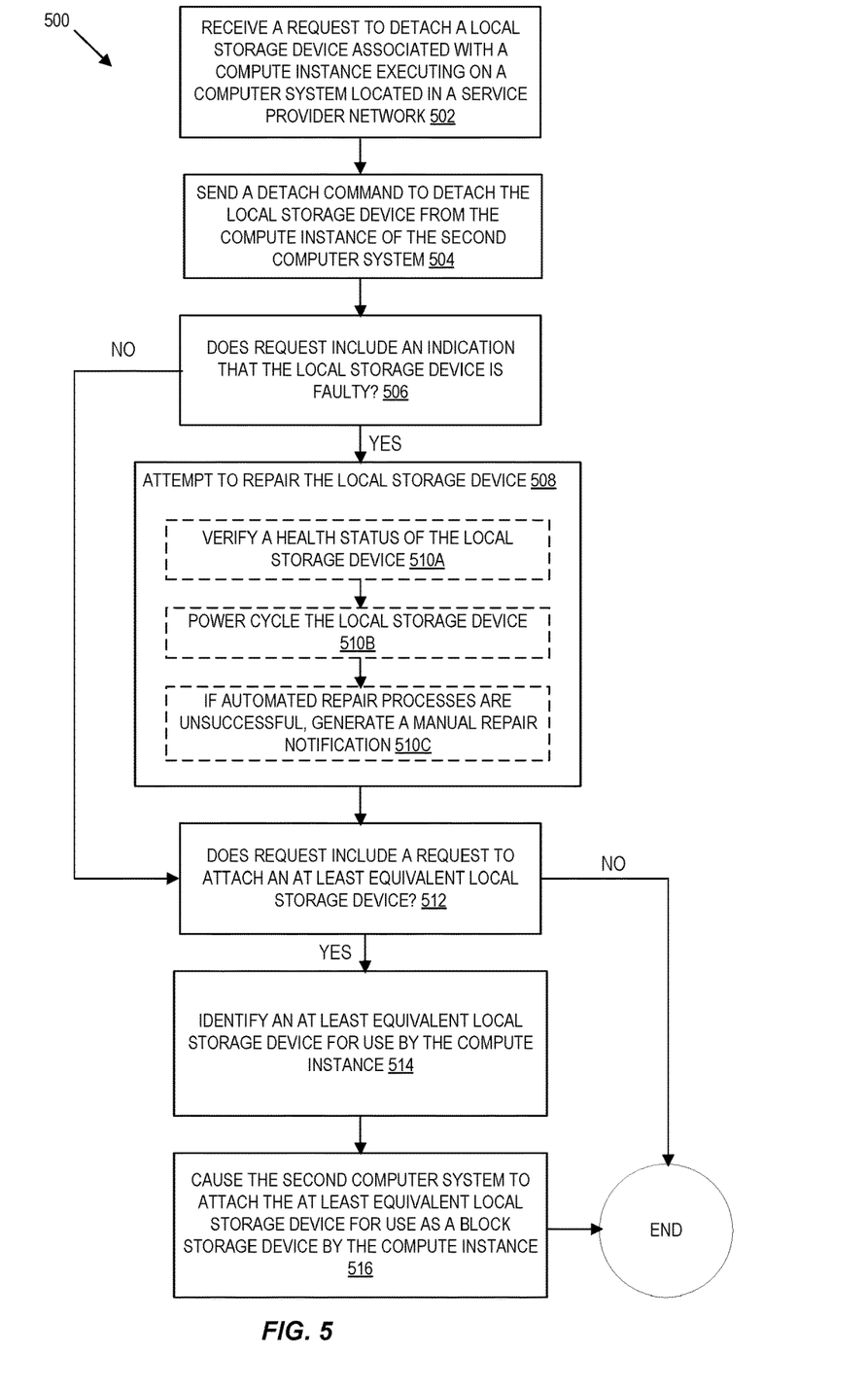
FIG. 5 is a flow diagram illustrating a process for receiving a request to detach a local, non-redundant storage device and, in response to the request, detaching the local storage device and, optionally, attaching an at least equivalent replacement storage device according to some embodiments.

FIG. 5 is a flow diagram illustrating operations 500 for managing local storage devices at computer systems of a service provider network according to some embodiments. Some or all of the operations 500 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are computer-implemented operations performed by various components of the other figures.

The operations 500 include, at block 502, receiving, at a first computer system of a service provider network, a request to detach a local storage device associated with a compute instance executing on a second computer system located in the service provider network. In some embodiments, the request includes an indication that a user associated with the compute instance desires to attach an at least equivalent storage device to the compute instance to replace the detached local storage device. In some embodiments, the request further includes an indication that the storage device is faulty. In some embodiments, the request is an API call that is received at an API endpoint provided by the service provider network. In some embodiments, the API also supports other types of local storage device-related operations such as, for example, attaching a local storage device, detaching and attaching a local storage device, creating a disk snapshot of a local storage device, restoring a local storage device from a disk snapshot, and so forth.

In some embodiments, the compute instance is one of a plurality of compute instances executing on the second computer system, and the user is one of a plurality of users associated with the plurality of compute instances. For example, a computer system of a hardware virtualization service 102 generally may support any number of concurrently executing compute instances, and the collection of compute instances executing on a computer system may be associated with one or more different users. In some embodiments, the local storage device includes a plurality of separate storage volumes and at least two of the plurality of separate storage volumes are associated with different compute instances executing on the computer system. The different compute instances may be associated with the same user or different users of the service provider network.

In some embodiments, the storage device is non-redundant, secondary storage locally connected to the computer system via an interconnect (for example, parallel AT Attachment (PATA), Serial ATA (SATA), Small Computer System Interface (SCSI), Serial Attached SCSI (SAS), Fibre Channel, or Ethernet), where the storage device is one of a HDD, SSD, or other type of secondary storage device.

In an embodiment, the operations 500 further include, at block 504, sending a detach command to detach the storage device from the compute instance of the second computer system, the detach command causing the second computer system to detach the storage device from the compute instance. In an embodiment, the storage device is unavailable to the compute instance of the second computer system for use as a block storage device when detached.

In an embodiment, the operations 500 further include, at block 506, determining whether the request includes an indication that the storage device is faulty. For example, the request to detach the storage device may include a flag or other indicator that the storage device is believed to be faulty.

If it is determined that the request includes an indication that the storage device is faulty, the operations 500 further include, at block 508, attempting to repair the storage device. In some embodiments, the attempt to repair the storage device can include one or more of: verifying a health state of the storage device (including running one or more performance tests) (at block 510A), power cycling the storage device (at block 510B), and, if the automated repair processes are unsuccessful, generating a notification indicating that the storage device is to be manually repaired or replaced (at block 510C). If the request does not include an indication of the storage device being faulty, the process proceeds to block 512.

In an embodiment, the operations 500 further include, at block 512, determining whether the request includes an indication that a user associated with the compute instance desires to attach an at least equivalent storage device to the compute instance.

If it is determined that the request includes an indication that the user desires to attach an at least equivalent storage device to the compute instance, the operations 500 further include, at block 514, identifying the at least equivalent storage device for use by the compute instance of the second computer system. In an embodiment, the at least equivalent storage device is one of: a repaired version of the first storage device, different storage locations of the first storage device, a second storage device to be installed at the second computer system to physically replace the storage device, or an available third storage device currently physically connected to the second computer system.

In an embodiment, the operations 500 further include, at block 516, causing the second computer system to attach the at least equivalent storage device to the compute instance, wherein the at least equivalent storage device is available to the compute instance for use as a block storage device once attached.

In some embodiments, a user may request for data to be migrated from the storage device to the equivalent storage device. For example, a control plane, computer system, or other service of the service provider network may obtain a disk snapshot associated with the storage device (either by locating an existing disk snapshot or creating a new disk snapshot) and use the disk snapshot to restore data contained on the storage device at a different storage device.

In some embodiments, a second request may be received, at the first computer system of the service provider network, to attach an additional storage device not currently associated with the compute instance executing on the second computer system. In this example, the first computer system sends an attach command to attach the additional storage device to the compute instance of the second computer system, where the attach command causes the second computer system to attach the additional storage device to the computer instance, where the additional storage device is available to the compute instance of the second computer system for use as a block storage device when attached.

Figure 6:
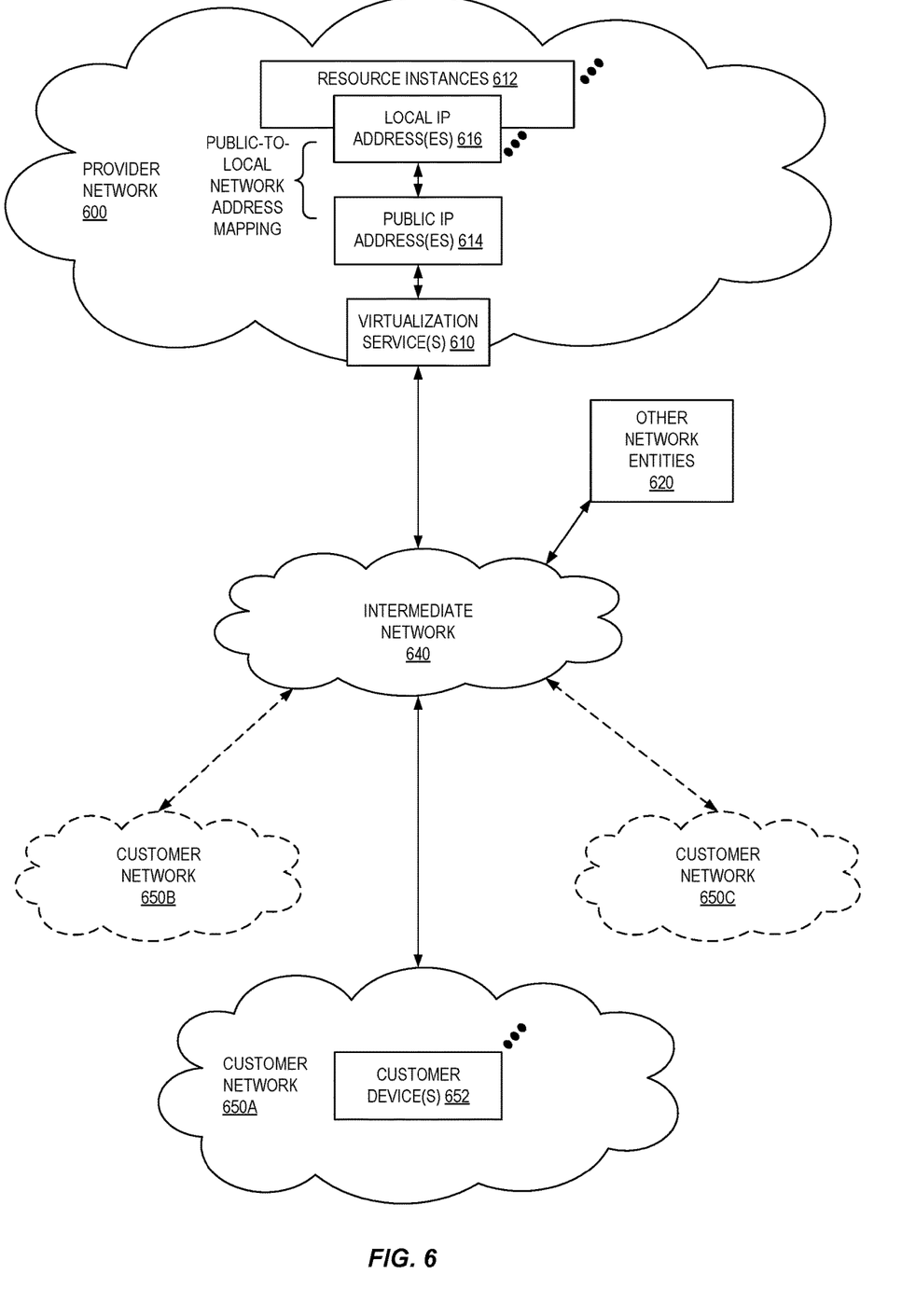
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local IP addresses 616 may be associated with the resource instances 612; the local IP addresses are the internal network addresses of the resource instances 612 on the provider network 600. In some embodiments, the provider network 600 may also provide public IP addresses 614 and/or public IP address ranges (for example, Internet Protocol version 4 (IPv4) or Internet Protocol version 6 (IPv6) addresses) that customers may obtain from the provider 600.

Conventionally, the provider network 600, via the virtualization services 610, may allow a customer of the service provider (for example, a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
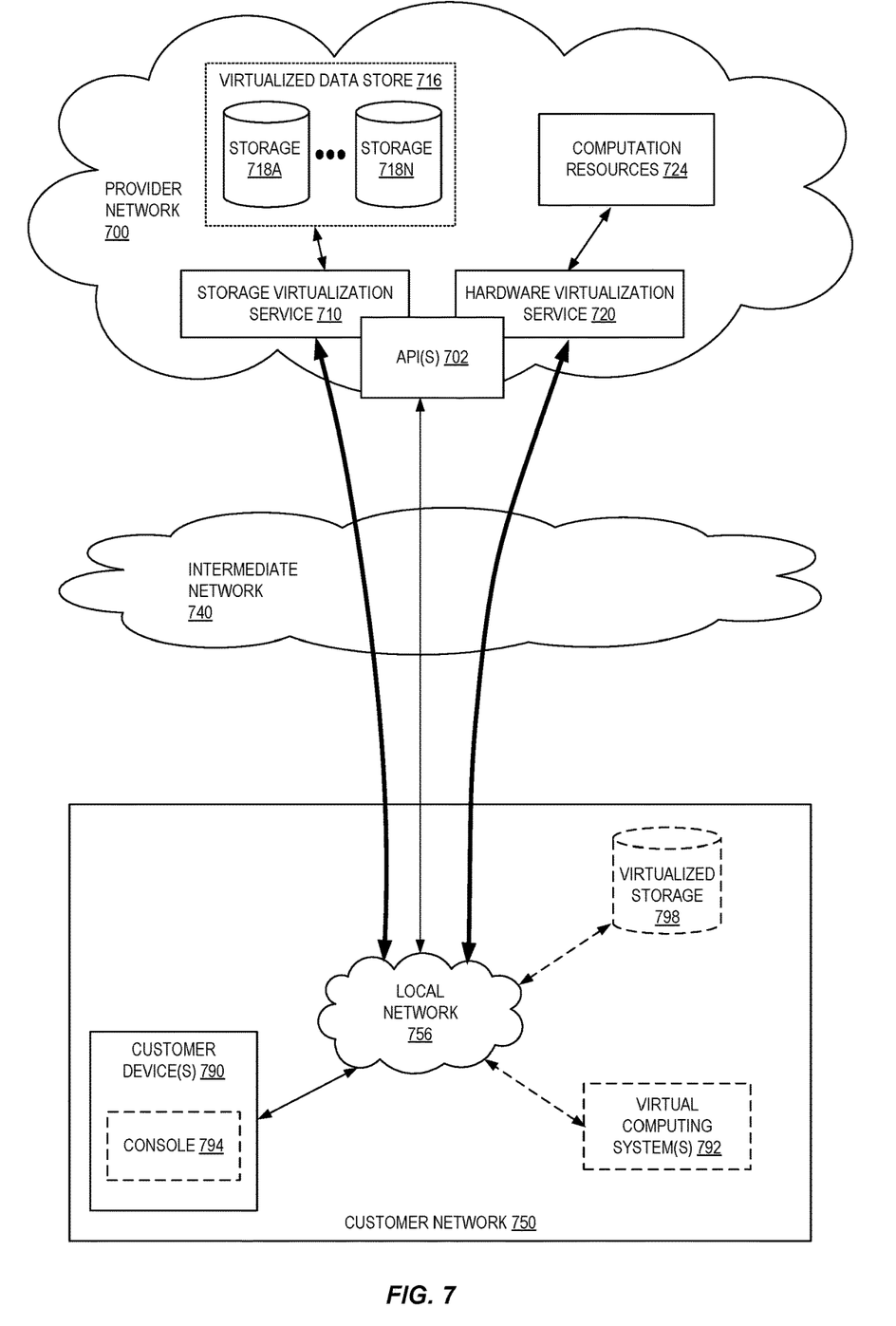
FIG. 7 is a block diagram of an example provider network that provides a storage virtualization service and a hardware virtualization service to customers according to some embodiments.

FIG. 7 is a block diagram of an example provider network that provides a storage virtualization service and a hardware virtualization service to customers, according to some embodiments. Hardware virtualization service 720 provides multiple computation resources 724 (for example, VMs) to customers. The computation resources 724 may, for example, be rented or leased to customers of the provider network 700 (for example, to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (for example, a web-based application, standalone application, mobile application, and so forth). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (for example, via console 794), the customer may access the functionality of storage virtualization service 710, for example via one or more APIs 702, to access data from and store data to storage resources 718A-718N of a virtual data store 716 provided by the provider network 700. In some embodiments, a virtualized data store gateway (not shown) may be provided at the customer network 750 that may locally cache at least some data, for example frequently accessed or critical data, and that may communicate with virtualized data store service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes, which appear to the user as local virtualized storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
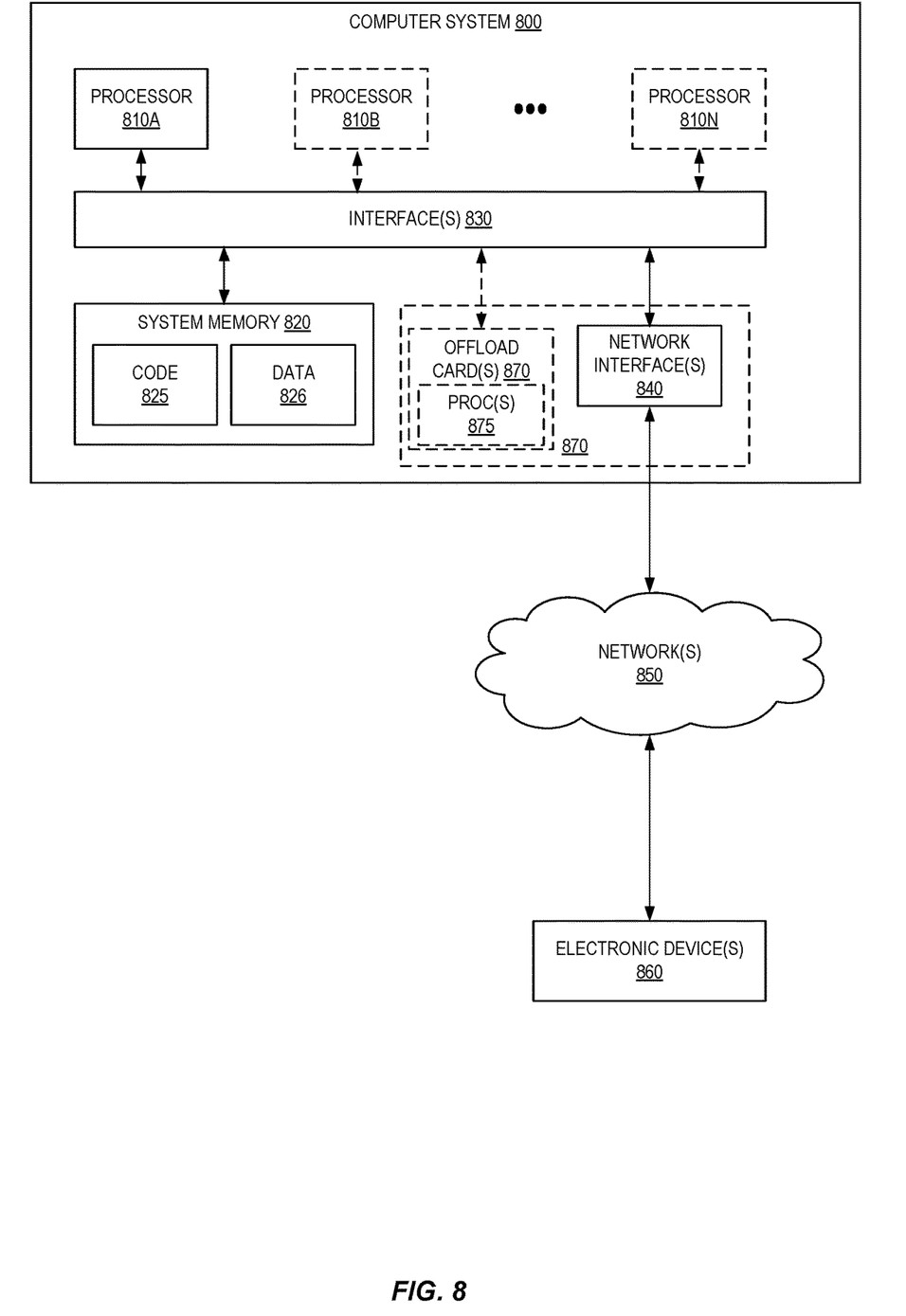
FIG. 8 is a block diagram illustrating an example computer system that may be used in some embodiments.

In some embodiments, a system that implements a portion or all of the techniques for managing local, non-redundant storage devices connected to computer systems of a service provider network as a service as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (for example, two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (for example, system memory 820) into a format suitable for use by another component (for example, processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (for example, a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (for example, operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, and so forth. These management operations may, in some embodiments, be performed by the offload card(s) 870 in coordination with a hypervisor (for example, upon a request from a hypervisor) that is executed by the other processors 810A-810N of the computer system 800. However, in some embodiments the virtualization manager implemented by the offload card(s) 870 can accommodate requests from other entities (for example, from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 800 via I/O interface 830. A non-transitory computer-accessible storage medium may also include any volatile or non-volatile media such as RAM (for example, SDRAM, double data rate (DDR) SDRAM, SRAM, and so forth), read only memory (ROM), and so forth, that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840. In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 104A-104N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method, the method comprising:
    receiving, at an application programming interface (API) endpoint of a service provider network, a request to detach a local storage device associated with a compute instance executing on a computer system located in the service provider network, wherein the request includes an indication that a user associated with the compute instance desires to attach an at least equivalent local storage device to the compute instance; and
    sending a detach command to detach the local storage device from the compute instance of the computer system, the detach command causing the computer system to:
        detach the local storage device from the compute instance, wherein the local storage device is unavailable to the compute instance of the computer system for use as a block storage device when detached, and
        attach an at least equivalent local storage device to the compute instance.

2. The computer-implemented method of claim 1, further comprising:
    identifying the at least equivalent local storage device for use by the compute instance of the computer system, wherein the at least equivalent local storage device is one of: a repaired version of the local storage device, different storage locations of the local storage device, a second local storage device to be installed at the computer system to physically replace the local storage device, or an available third local storage device currently connected to the computer system, wherein the at least equivalent local storage device is available to the compute instance for use as a block storage device once attached.

3. The computer-implemented method of claim 1, wherein the request to detach the local storage device further includes an indication that the local storage device is faulty, and wherein the detach command further causes the computer system to attempt to repair the local storage device by performing one or more of: verifying a health status of the local storage device, power cycling the local storage device, running one or more performance tests of the local storage device, and generating a notification indicating that the local storage device is to be manually repaired or replaced.

4. The computer-implemented method of claim 1, further comprising:
    identifying the at least equivalent local storage device for use by the compute instance of the computer system; and
    generating an event message indicating to the user that the at least equivalent local storage device is available.

5. The computer-implemented method of claim 1, further comprising identifying the at least equivalent local storage device for use by the compute instance of the computer system, and wherein the computer system monitors for availability of the at least equivalent local storage device and automatically attaches the at least equivalent local storage device when available.

6. The computer-implemented method of claim 1, wherein the local storage device is non-redundant storage connected to the computer system via an interface including one or more of: parallel AT Attachment (PATA), Serial ATA (SATA), Small Computer System Interface (SCSI), Serial Attached SCSI (SAS), Fibre Channel, or Ethernet.

7. The computer-implemented method of claim 1, wherein the local storage device is one of: a hard disk drive (HDD) or a solid-state drive (SSD).

8. The computer-implemented method of claim 1, wherein the compute instance is one of a plurality of compute instances executing on the computer system, and wherein each compute instance of the plurality of compute instances is associated with a user of a plurality of users associated with the plurality of compute instances.

9. The computer-implemented method of claim 1, wherein the local storage device includes a plurality of separate storage volumes, and wherein at least two different compute instances are associated with a storage volume of the plurality of separate storage volumes.

10. The computer-implemented method of claim 1, further comprising:
    obtaining a disk snapshot associated with the local storage device; and
    using the disk snapshot to restore data contained on the local storage device at a different local storage device.

11. The computer-implemented method of claim 1, wherein the request is a first request and the local storage device is a first storage device, the method further comprising:
    receiving, at an API endpoint of the service provider network, a second request to attach an additional storage device not currently associated with the compute instance executing on the computer system; and
    sending an attach command to attach the additional storage device to the compute instance of the computer system, the attach command causing the computer system to attach the additional storage device to the compute instance, wherein the additional storage device is available to the compute instance of the computer system for use as a block storage device when attached.

12. The computer-implemented method of claim 1, further comprising:
    determining that an at least equivalent local storage device is not available at the computer system; and
    sending a migration command to a server migration service of the service provider network, the migration command causing the server migration service to migrate the compute instance to a third computer system having an at least equivalent local storage device.

13. A system comprising:
a control plane implemented by one or more electronic devices of a service provider network, the control plane including instructions that upon execution cause the one or more electronic devices to:
    receive, at an application programming interface (API) endpoint of the service provider network, a request to detach a local storage device associated with a compute instance executing on a host computer system of a hardware virtualization service of the service provider network, wherein the request includes an indication that a user associated with the compute instance desires to attach an at least equivalent local storage device to the compute instance; and
    send a detach command to the host computer system to:
        detach the local storage device from the compute instance, wherein the local storage device is unavailable to the compute instance for use as a block storage device when detached, and
        attach an at least equivalent local storage device to the compute instance; and
the host computer system storing instructions that upon execution cause the host computer system to:
    receive the detach command to detach the local storage device from the compute instance;
    detach the local storage device from the compute instance; and
    attach the at least equivalent local storage device to the compute instance.

14. The system of claim 13, wherein the control plane further identifies the at least equivalent local storage device for use by the compute instance, wherein the at least equivalent local storage device is one of: a repaired version of the local storage device, different storage locations of the local storage device, a second local storage device to be installed at the host computer system to physically replace the local storage device, or an available third local storage device currently connected to the host computer system.

15. The system of claim 13, wherein the request to detach the local storage device further includes an indication that the local storage device is faulty, and wherein the detach command further causes the host computer system to attempt to repair the local storage device by performing one or more of: verifying a health status of the local storage device, power cycling the local storage device, running one or more performance tests of the local storage device, and generating a notification indicating that the local storage device is to be physically replaced.

16. The system of claim 13, wherein the compute instance is a first compute instances and the local storage device includes a plurality of storage volumes, and wherein at least one of the plurality of storage volumes is attached to a second compute instance that is different from the first compute instance.

17. The system of claim 13, wherein the local storage device is one of: a hard disk drive (HDD) or a solid-state drive (SSD).

18. The computer-implemented method of claim 1, wherein the API endpoint is provided by a hardware virtualization service of the service provider network, and wherein a plurality of users of the service provider network use the hardware virtualization service to launch compute instances at computer systems including the computer system.

19. The computer-implemented method of claim 1, the method further comprising:
    executing a verification test used to ensure that the at least equivalent local storage device is fully operational.

20. The computer-implemented method of claim 1, wherein the detach command is sent to an agent running on the computer system, and wherein the agent instructs a virtual machine manager (VMM) running on the computer system to detach the local storage device.

* * * * *